May 29, 1951 L. F. NENNINGER ET AL 2,555,242
MILLING MACHINE TRANSMISSION AND CONTROL MECHANISM
Filed March 5, 1945 3 Sheets-Sheet 1

INVENTORS
LESTER F. NENNINGER
BY EDGAR D. VANCIL
FRED A. HASSMAN
Leigh W. Wright
ATTORNEY May 29, 1951 L. F. NENNINGER ET AL 2,555,242
MILLING MACHINE TRANSMISSION AND CONTROL MECHANISM
Filed March 5, 1945 3 Sheets-Sheet 2
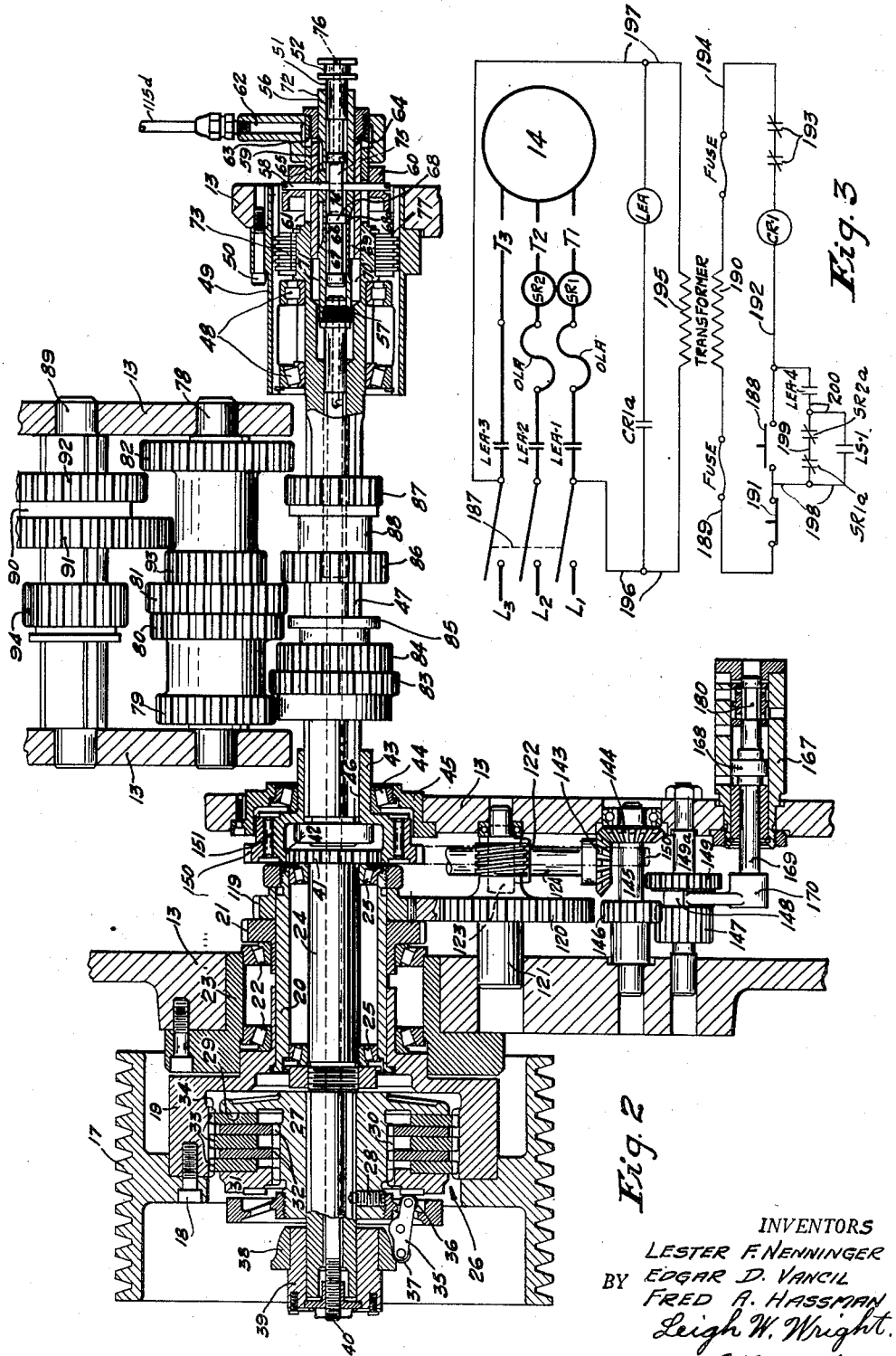
INVENTORS
LESTER F. NENNINGER
BY EDGAR D. VANCIL
FRED A. HASSMAN
Leigh W. Wright.
ATTORNEY

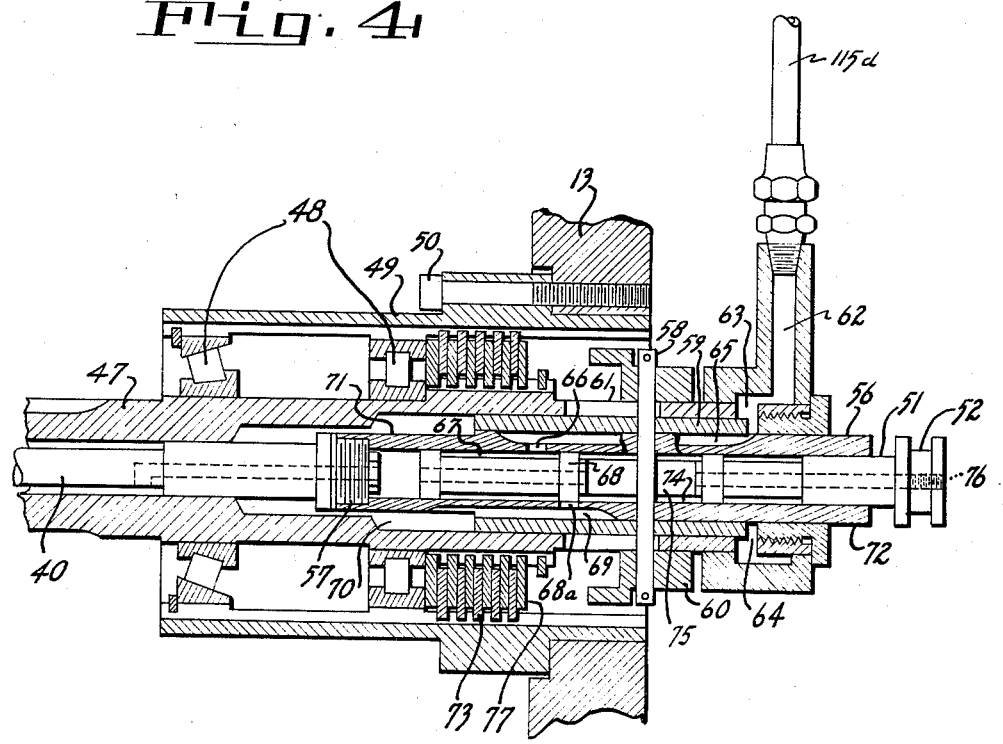

Patented May 29, 1951

2,555,242

UNITED STATES PATENT OFFICE 2,555,242

MILLING MACHINE TRANSMISSION AND CONTROL MECHANISM

Lester F. Nenninger, Edgar D. Vancil, and Fred A. Hassman, Cincinnati, Ohio, assignors to The Cincinnati Milling Machine Co., Cincinnati, Ohio, a corporation of Ohio Application March 5, 1945, Serial No. 581,087

19 Claims. (Cl. 74—472)

This invention relates to transmission and control mechanism for machine tools and more particularly for milling machines.

One of the objects of this invention is to improve the operation and control of a milling machine whereby changes in a change speed transmission thereof may be effected quietly, quickly, and efficiently.

An additional object of this invention is to provide in conjunction with a power operable rate change mechanism for a machine tool transmission, improved means for automatically imparting a slow rate of rotation to the transmission to assist intermeshing of the gears and thereby facilitate rate changes therein.

Another object of this invention is to provide in a machine tool improved safety features which prevent damage or breakage of the rate change elements of the machine and which function automatically and without attention on the part of the operator other than that normally required for effecting a desired change of rate.

An additional object of this invention is the provision in a milling machine, having a variable speed transmission driven by a prime mover and a rate change mechanism, of interlocking means to prevent rate changes being made when the prime mover is driving the transmission.

Still another object is to provide an arrangement, in conjunction with a power controlled shiftable element change speed transmission driven by a prime mover, which automatically delays the application of the driving power from the prime mover to the transmission until all of the shiftable elements are in proper driving engagement.

And a further object is to provide in conjunction with a change speed transmission driven by a prime mover, an arrangement to automatically vary the power output of the prime mover to the transmission when the transmission is being operated in certain speed ranges.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings similar reference characters are employed to denote the same or similar parts.

Figure 2 is an enlarged fragmentary sectional view of a portion of the change speed transmission showing certain features of this invention in detail.

Figure 3 is a wiring diagram of the power and control circuits for the prime mover for driving the change speed transmission.

Figure 4 is an enlarged sectional view of the clutch control mechanism shown in Figure 2.

Figure 1:
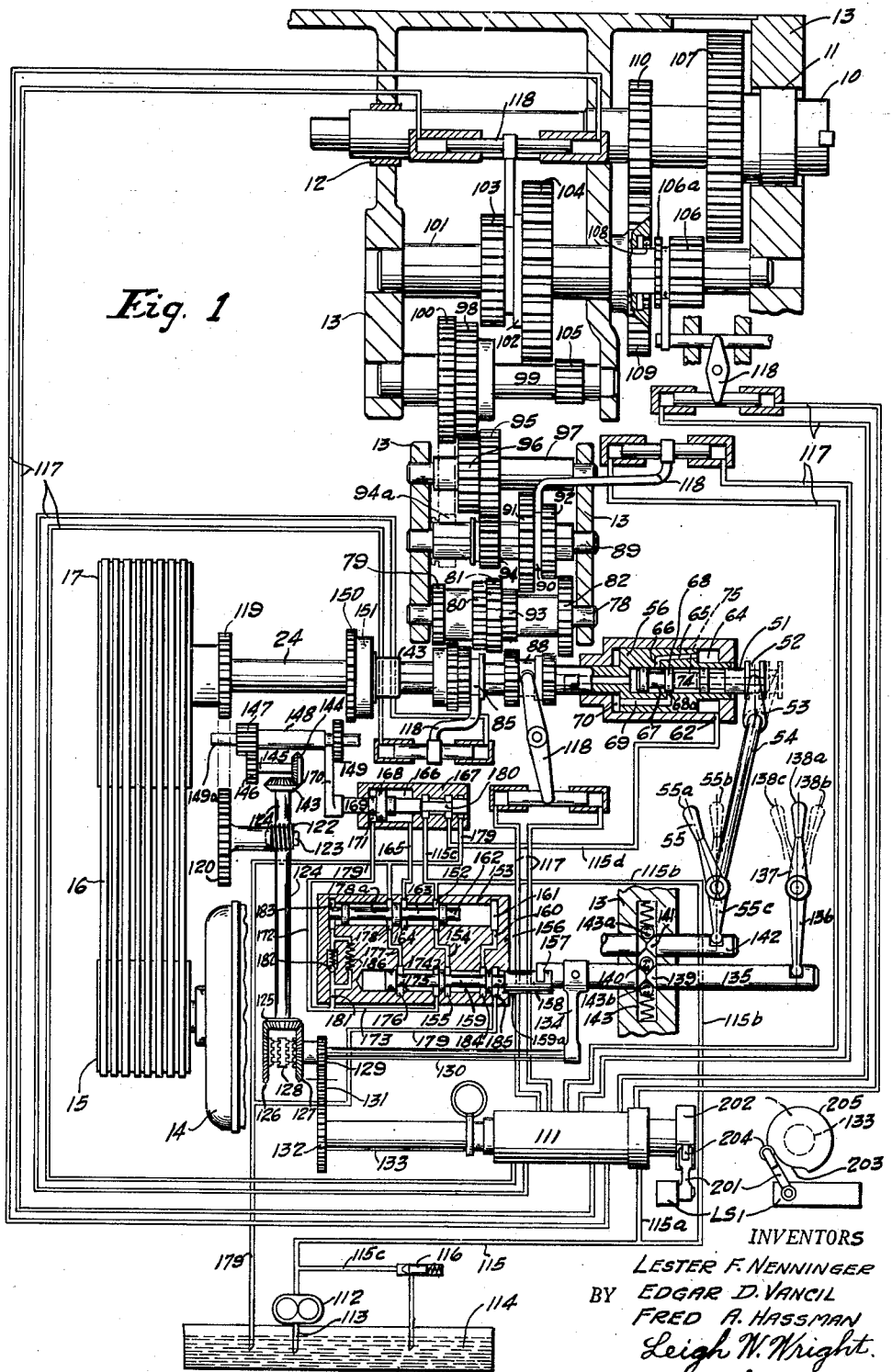
Figure 1 is a diagram of a power controlled change speed transmission of a milling machine incorporating the features of this invention.

For illustrative purposes, this invention is shown applied to a change speed transmission of a milling machine having a cutter spindle 10 journaled in appropriate bearings 11 and 12 in the milling machine column 13. Power for driving the transmission and cutter spindle 10 is derived from a prime mover or motor 14 having a motor pulley 15 which transmits power through the belts 16 to the main driving pulley 17, Figure 2. The pulley 17 is fixed by suitable screws 18 to the clutch member 19 which is rigidly mounted on the sleeve 20 upon which is also fixed a gear 21. The member 19 and gear 21 are supported on suitable bearings 22 carried in a support 23 fixed to the machine frame or column 13 so that the pulley 17 is freely rotatable on the bearings 22. This pulley is constantly driven by the prime mover 14 at all times during the operation of the machine.

The power input drive shaft 24 for the change speed transmission is journaled on suitable bearings 25 supported in the sleeve 20 and is adapted to be connected to or disconnected from the driving pulley 17 by means of a multiple disc clutch indicated generally at 26. This clutch comprises a clamping plate member 27 which is fixed to the input drive shaft 24 by a suitable screw 28 and has a radially extending abutment face 29 formed thereon. On the clamping plate member 27 is formed a gear 30 upon which is axially slidably mounted in driving relationship the pressure plate 31 which may be moved to and from the abutment surface 29 of the clamping plate member so as to clamp or release the clutch plates 32 connected in driving relationship through the gear 30 to the clamping plate member 27, and the clutch plates 33 drivingly engaged with the member 19 by the internal gear connection 34 so as to frictionally connect or disconnect driving power from the pulley 17 to the input drive shaft 24. A suitable toggle arrangement indicated at 35 having pressure rollers 36 engaging the pressure plate 31 and having rollers 37 engaging the operating cam spool 38, carried on the sleeve 39 axially slidable on the input shaft 24 and connected to the push rod 40, serve to actuate the pressure plate 31 to effect engagement or disengagement of the multiple disc clutch 26 upon axial movement of the push rod 40.

The input drive shaft 24 has formed on its inner end a gear 41 which meshes in driving relationship into an internal gear 42 formed in the overrunning clutch sleeve 43. This sleeve is journaled in a suitable bearing 44 carried in a mounting 45 fixed to the column 13. Mounted in driving relationship in a bore 46 formed in the sleeve 43 is the shaft 47 of the change speed transmission. The other end of the shaft 47 is journaled on a pair of bearings 48 carried in a sleeve 49 fixed to the column 13 by suitable screws 50. Thus, the input drive shaft 24 and the coaxially mounted shaft 47 rotate in unison to transmit power from the pulley 17 to the change speed transmission in the column.

The push rod 40 for actuating the multiple disc clutch 26 is operated and controlled through a hydraulic servo-operated mechanism of a type for example as shown in Patent No. 1,938,780, issued December 12, 1933, and in application, Serial No. 547,196, filed July 29, 1944, now Patent No. 2,537,409 dated January 9, 1951. This servo-control mechanism comprises a servo - valve plunger 51 having an operating spool 52 which is engaged by an appropriate lever 53, Figure 1, carried on a rock shaft 54, appropriately mounted in the machine frame, to which is connected the main drive clutch or spindle stop and start operating lever 55. The servo-valve plunger 51 is axially reciprocatable in a sleeve 56, the sleeve 56 being rigidly attached to the push rod 40 by a suitable threaded connection 57. Surrounding the sleeve 56 and rigidly attached to it by the pin 58 is the piston sleeve 59. The pin 58 also secures the braking collar 60, slidably mounted on the surface 61 of the shaft 47, to the sleeve 56 and the piston sleeve 59. Fluid pressure for operating this hydraulic servo control enters through a passageway 62 which is connected through a passage 63 in the shaft 47 to the chamber 64 behind the piston sleeve 59. Fluid from this chamber may pass out through the channel 65 formed in the sleeve 56 and then through a port 66 into the annular groove 67 formed in the valve plunger 51.

When it is desired to engage the main drive clutch 26, the lever 55 is moved from the stop position 55a to the start position 55b to thus move the servo-valve plunger 51 to the right which moves the valve spool 68 so as to connect the port 66 through the annular groove 67 to the port 68a formed in the sleeve 56 which communicates with the passageway 69 to conduct fluid to the chamber 70 behind the left hand end of the piston sleeve 59, Figures 1 and 2. The diameter 71 of the sleeve 56 in this chamber is smaller than the diameter 72 of the sleeve 56 in the chamber 64 so that the differential in pressure between the chamber 64 and 70 will cause the piston sleeve 59 and the push rod 40 connected to the sleeve 56 and also the brake collar 60 to move to the right to disengage the multiple disc brake 73 and move the push rod 40 to the right, causing the actuating cam 38 of the multiple disc clutch to effect engagement of the friction discs 32 and 33 to connect the driving pulley 17 to the shaft 47 to drive the change speed transmission. The push rod 40 and associated sleeve 56 will continue to the right to effect proper engagement of the cam 38 of the clutch and will so move to the position shown in Figure 2 where the port 68a will again be closed off by the spool 68 as the servo-mechanism automatically recovers to a neutral position of full engagement of the main drive clutch 26.

When it is desired to disconnect driving power from the prime mover and arrest rotation of the change speed transmission, the control lever 55 is moved from the start position 55b back to the stop position 55a, thus moving the servo-valve plunger 51 to the left. The spool 68 of the plunger is thus moved to the left with respect to the port 68a so as to connect the chamber 70 through the port 68a to the annular groove 74 of the valve plunger 51, which groove, in turn, is connected to the elongated diametrically extending slot 75 in which moves the pin 58. This slot is connected to the exhaust passageway 76 formed in the plunger 51 to thereby relieve pressure in the chamber 70. The port 66 at the same time is closed off from connection with the port 68a so that fluid pressure will be confined in the chamber 64 behind the piston sleeve 59 to cause it and the associated push rod 40 to move to the left, disengaging the cam 38 from the toggle fingers 35 and thereby releasing engagement of the friction clutch 26. As the push rod 40 and associated brake collar 60 move to the left the brake collar 60 engages the abutment face 77 of the multiple disc brake 73 to rapidly stop rotation of the change speed transmission.

As long as fluid pressure is maintained in the passageway 62 and with the lever 55 in the stop position 55a the recovery movement of the sleeve 56 with respect to the plunger 51 will be stopped by the engagement of the brake collar 60 with the abutment face 77 of the multiple disc brake so that the relationship of the spool 68 to the port 68a will be such as to maintain the chamber 70 connected to the discharge passageway 76 while closing off port 66 from connection with the port 68a to thus maintain fluid pressure in the chamber 64 and thereby maintain the brake 73 effective to prevent rotation of the change speed transmission after the change speed transmission has been decelerated to a stop. Thus, the spindle control lever 55 may be moved to a running position 55b to engage the friction clutch 26 to effect rotation of the change speed transmission from the prime mover or it may be moved to the stop position 55a to disconnect the prime mover and to effect a braking and deceleration of the rotation of the transmission to a stopped condition.

Power from the shaft 47 is transmitted through four speed changes to a shaft 78 preferably journaled in the machine frame or column 13 upon which is fixed a series of speed change gears 79, 80, 81, and 82. The gears 79 and 80 are adapted to be respectively engaged by the gears 83 and 84 of a compound gear 85 slidably mounted in splined driving relationship on the shaft 47. The gears 81 and 82 may be respectively engaged by the gears 86 and 87 of the compound gear 88 which is also slidably mounted in splined driving relationship for axial movement on the shaft 47. Thus, by appropriately shifting the compound gears 85 and 88 into the respective mating gears on the shaft 78, the shaft 78 may be driven at a plurality of four different speed changes from the shaft 47.

Further speed changes are provided between the shaft 78 and a shaft 89 appropiately journaled in the column 13 of the machine. A compound gear 90 having gears 91 and 92 is mounted in sliding splined driving relationship on the shaft 89 and may be engaged with gears 93 and 82 fixed on the shaft 78.

Also mounted in sliding splined driving relationship on the shaft 89 is a reversing gear 94 which may be shifted at one time into engagement with a gear 95 fixed together with a gear 96 on a shaft 97 appropriately journaled in the column 13. The gear 96 in turn drives a gear 98 fixed on a shaft 99 journaled in the column 13. The gear 94 may also be moved to the position 94a, Figure 1, where it then directly engages a gear 100 fixed on the shaft 99 to thus impart an opposite direction of rotation of the shaft 99 with respect to the shaft 89 from that when the gear 94 is in mesh with the gear 95. Preferably the gear 94 may be shifted axially on the shaft 89 by any suitable manual control means so as to effect a change in direction of rotation of the cutter spindle 10.

On a shaft 101 journaled in the column 13 is slidably mounted in driving splined relationship the compound gear 102 comprising the gears 103 and 104 which may be respectively engaged with the gears 98 and 105 fixed on the shaft 99 to thereby effect two additional speed changes between the shaft 99 and the shaft 101. On the shaft 101 is also slidably mounted in splined driving relationship a pinion 106 which may be moved in one direction to engage the gear 107 fixed on the cutter spindle 10 or moved in the opposite direction to engage its gear portion 106a with an internal gear portion 108 formed in the gear 109 journaled on the shaft 101 and which latter gear 109 is in engagement with the gear 110 fixed to the cutter spindle 10.

There has thus been provided a change speed gear transmission between the shaft 47 and the cutter spindle 10 having a series of shiftable members or compound gears 85, 88, 90, 102, and 106 which may be actuated in a predetermined sequence to obtain a complete range of speeds for the cutter spindle from the constantly rotating prime mover 14.

In order to actuate all of these gear combinations in proper sequential relationship, it is preferred to use a power operated gear shifting mechanism of a type shown in United States Letters Patent No. 2,012,081, issued August 20, 1935. In such a mechanism a fluid pressure pump 112 withdraws fluid through a suction line 113 from a reservoir 114 and transmits the fluid under pressure through a line 115 and 115a to a selector valve 111. A suitable fluid pressure relief valve 116 connected through a line 115c serves to maintain the proper desired pressure in the line 115 and associated connecting lines. Since the detail structure of the selector valve 111 is fully set forth in the above-mentioned patent, it is believed sufficient to state that suitable fluid pressure control lines 117 connected to hydraulically actuated shifting devices 118 serve to deliver fluid to actuate the various shiftable gear elements 85, 88, 90, 102, and 106 in a predetermined sequential relationship upon rotation of the control shaft 133 for selector valve to desired positions to effect the entire range of speeds for the change speed transmission.

The selector valve 111 may be driven in either direction to effect an increasing or decreasing selection of speeds for the transmission by power derived from the constantly operating main drive pulley 17 through the gear 119 fixed on the sleeve 20 constantly rotated by the pulley 17. The gear 119, in turn, drives a gear 120 which is journaled on a shaft 121 fixed in the column 13, the gear having formed integral therewith a worm 122 which engages a worm wheel 123 fixed on the shaft 124 appropriately journaled in the column 13. On the shaft 124 is a bevel pinion 125, Figure 1, which simultaneously engages and drives a pair of bevel gears 126 and 127 in opposite directions. Each of these bevel gears 126 and 127 may be engaged through an appropriate reversing clutch 128 so as to cause a gear 129 to be rotated in one direction or the other or stopped in rotation by manipulation of a shifter rod 130 connected to the reversing clutch. The gear 129, in turn, is connected through suitable gearing 131 and 132 on the selector valve drive shaft 133 so that operation of the reversing clutch 128 effects driving of the selector valve 111 in one direction or the other or arrests its rotation in a desired position for a particular speed selected for the transmission.

The reversing clutch 128 is controlled through the shifter arm 134 connected to the shifter rod 130 and carried on a shifter rod 135 connected through an appropriate lever arm 136 with the speed change control lever 137. This lever has a neutral position 138a, a speed increase position 138b and a speed decrease position 138c, Figure 1. Thus, by manipulating the control lever from a neutral position 138a to either of the positions 138b, or 138c, the reversing clutch 128 will be so operated as to drive the selector valve 111 to effect increasing or decreasing rates of speed selection in the transmission.

Interlocking mechanism is provided between the operating mechanism for the main drive friction clutch 26 and the speed changing mechanism for the transmission. In the shifter rod 135 is formed an appropriate detent groove 139 which may be engaged by a common detent ball 140 which also is adapted to engage in a detent notch 141 formed in a shifter rod 142 actuated by a lever 55c formed integral with the lever 55. The detent ball 140 is carried in an appropriate bore 143 formed in the column 13 so that it is possible to move only one or the other of the shifter rods 135 or 142 at a time from a position shown in Figure 1. A ball detent 143a in the bore 143 co-operates with the notch 141 of the rod 142 to facilitate positioning the spindle control lever 55 in the stop position 55a while the detent ball 143b facilitates positioning the lever 137 in neutral position.

When the spindle control lever 55 is moved from the stop position 55a to start position 55b the detent notch 141 will move out of the bore 143 and prevent the common detent ball 140 from rising out of the detent notch 139 of the shifter 135 so as to thereby lock the speed change control lever 137 in the neutral position 138a. Similarly, when the speed change lever 137 is in either the increase or decrease position 138b or 138c, the common detent ball 140 will be held upwardly in the detent notch 141 of the shifter rod 142 so as to hold the spindle control lever 55 in the stop position. Neither of the levers 55 and 137 can be simultaneously operated to the positions 55b, 38b, and 38c. Thus, this interlock mechanism prevents making speed changes while the prime mover is driving the transmission and also prevents the spindle prime mover from being connected in driving relationship with the transmission while speed changes are being made.

In a change speed transmission of this character which is adapted to operate at very high speeds in certain instances to take advantage of modern carbide cutting tools, the acceleration and deceleration of the transmission during starting and stopping of the work spindle must necessarily take place very rapidly. As a result, as the various gear selections have been hydraulically made upon rotation of the selector valve 111 by manipulating the speed change control lever 137 it may frequently happen that the gears have not moved their full axial distance for the speed selected in that side teeth faces may be abutting against each other. Particularly when high speed ranges have been selected, the reengagement of the spindle clutch would cause such a rapid and sudden acceleration of the gear transmission that the gear could not complete its axial movement before certain shafts had arrived at full high speed rotation. There would thus be a clashing of the faces of the not-yet engaged gears under these conditions, resulting in possible damage to the transmission and disturbing noise and vibration to the machine and operator.

In order to avoid the difficulty of this partial engagement of the gears, there is provided an arrangement which automatically rotates the transmission at a relatively slow speed during the time speed changes are being made in the transmission and which also continues this slow speed rotation for a predetermined desired interval after the speed selection has been made to insure full engagement of all of the selectable gear changes before the power from the prime mover may again be applied to the transmission.

The power for slowly rotating the transmission gearing is obtained from a bevel pinion 143, Figures 1 and 2, fixed on the shaft 124 which is constantly driven from the main drive pulley as described. This pinion 143, in turn, meshes with a mating bevel gear 144 fixed on a shaft 145 appropriately journaled in suitable bearings in the column 13. This shaft also has fixed on it a gear 146 which is constantly in mesh with a wide-faced gear 147 of a compound gear 148. The compound gear is journaled for axial movement on a shaft 149a fixed in the column 13. The other gear 149 of the compound gear 148 is adapted to be shifted into or out of engagement with a gear 150 which is journaled to rotate on the overrunning clutch sleeve 43 and adapted to be connected through an overrunning clutch roller assembly 151 with this sleeve for one direction of rotation while to be free to rotate on the sleeve 43 for the other direction of rotation. The overrunning clutch 151 is so arranged that the gear 150 is capable of driving the shaft 47 in the same direction that it is normally driven by the main drive pulley 17 while the shaft 47 cannot drive the gear 150 in its normal direction of rotation. The purpose of this arrangement is to permit the gear 149 to be shifted into engagement with the gear 150 without clash or damage to the transmission, should it be still rotating when the speed change lever is moved to an operative position. This condition might occur in instances where the operator moves the spindle control lever to stop position 55b and then instantly operates the speed change lever while the transmission is still coming to a stop under the influence of the brake 73.

There is provided a relatively slow speed of rotation to the shaft 124 by the large reduction in speed through the worm 122 and worm wheel 123 combination so that the gear 149 rotates the gear 150 at a relatively low speed when the gear 149 is shifted into engagement with the gear 150 to thus effect slow rotation of the change speed transmission when the main drive clutch 26 is disengaged.

Fluid pressure means is provided for shifting the gear 149 into engagement with the gear 150 whenever speed selections are to be made by moving the control lever 137 to either the position 138b or 138c. Fluid pressure from the line 115 is connected through a line 115b to a port 152 of a shuttle valve indicated generally at 153. Pressure is also connected through a passageway 154 to a port 155 in the control valve indicated generally at 156. The speed selection control lever 137 is connected to the rod 135 which, in turn, is connected through a suitable connection 157 to the plunger 158 of the control valve 156. When the lever is in the neutral position 138a shown in Figure 1, the valve plunger 158 will be positioned so that pressure from the port 155 is connected through the annular groove 159 to the passageway 160 connected to the port 161 of the shuttle valve 153 so as to hold its plunger 162 in the position as shown in Figure 1. Pressure at the port 152 is thus connected through the annular groove 163 of the shuttle valve plunger 162 to the port 164 and the line 165 connected to the chamber 166 in the shifter cylinder 167 to thereby move the shifter piston 168, to the left as shown in Figure 1. This causes the piston rod 169 to which is attached the shifter fork 170 engaging the compound gear 148 to move the gear 149 out of engagement with the gear 150. Discharge from the chamber 171 on the opposite side of the piston 168 at this time passes out through the line 172 and the line 173 to the port 174 of the control valve 156 and then through the annular groove 175 to the port 176 which is connected to the passageway 177 at this time. Passageway 177 is connected to the port 178 of the shuttle valve 153 which at this time is connected through the annular groove 178a to the drain line 179 for return of fluid to the reservoir 114.

At the same time pressure from the line 115b passes through the connecting line 115c through the annular groove 180 formed in the piston rod 169 of the shifter cylinder 167 and out through the pressure line 115d connected to the inlet port 62 of the servo-clutch control mechanism, Figure 2. When the speed change control lever 137 is moved to an operative position, such as the position 138b, fluid pressure from the line 115b will be connected from the port 155 of the control valve 156 through the annular groove 159 of the valve plunger 158 to the line 173 and will then be transmitted through the line 181 through the check valve 182 to the port 183 to thereby shift the shuttle valve to the opposite position to the right from that shown in Figure 1. Pressure will also pass through the line 172 to the chamber 171 behind the piston 168 to cause it to move to the right, Figure 1, to engage the gear 149 with the gear 150 to thereby cause slow rotation of the change speed transmission. Discharge from the chamber 166 behind the piston 168 at this time will then pass out through the line 165, the annular groove 178a in the shuttle valve plunger 162 to the port 178 and then into the drain line 179 for return of fluid to the reservoir 114. In moving the shuttle valve plunger 162 to the right, Figure 1, fluid is discharged from the port 161 through the line 160 to the port 184 of the valve 156 through the annular groove 159a to the port 185 and thus to the drain line 179 for return of fluid to the reservoir 114.

It is to be noted that as the piston 168 shifts to the right, Figure 1, that the annular groove 180 in the piston rod 169 will be moved also to the right so as to close off pressure coming in through line 115c from entering the line 115d to thereby remove pressure from the servo-control valve for the main drive clutch while at the same time connecting the line 115d to the drain line 179 to remove all pressure from this servo-control valve. In so doing, the fluid pressure holding the multiple disc brake 73 in operation will be released so that now the change speed transmission may be freely rotated at the slow speed upon engagement of the gear 149 with the gear 150 without restricting this movement by the multiple disc brake 73.

Similarly, when the speed change lever 137 is moved to the position 138c fluid pressure from the line 115b will then be transmitted through the passageway 154, the annular groove 175 of the valve 156, into the line 173 to again shift the shuttle valve plunger 162 and the piston 168 to the right, Figure 1, as described when the lever 137 was moved to the other position 138b.

As soon as a desired speed selection has been made and the lever 137 is allowed to return to its neutral position 138, the shuttle valve plunger 162 does not immediately return to the position shown in Figure 1. This is because the fluid trying to escape through the port 183 of the valve 153 must discharge at a predetermined slow rate through a fluid resistance 186 around the check valve 182 into the line 181 which now is connected to the line 173, the annular groove 175 of the valve plunger 158, the passageway 177, and the port 178 of the valve 153 to discharge into the drain line 179. By appropriately adjusting the fluid resistance 186 the plunger 162 will move slowly to the left to finally reach the position shown in Figure 1 to again disconnect the gear 149 from the gear 150 after a predetermined interval of time has elapsed from the time the speed change lever is moved to neutral.

Thus, in this arrangement after a speed selection has been made and the lever 137 is returned to its neutral position 138a, the slow speed rotation of the transmission continues for a predetermined short interval to make sure that all of the gears shifted to the desired position by the hydraulic mechanism controlled by the selector valve 111 have fully dropped into full meshing engagement. It is to be also noted that the annular groove 180 prevents starting of the spindle by maintaining the fluid pressure cut off from the servo-controlled valve until this slow speed rotation has fully completed the engagement of all of the shifted gears to thus prevent starting the drive from the prime mover to the transmission before all of the gears have dropped into full meshing engagement.

It is also desirable to change the horsepower output of the prime mover to the change speed transmission when the transmission is adjusted to various speed ranges. This is accomplished by providing electrical control means operable by the speed change mechanism to vary the horsepower output of the motor 14 to a reduced sustained value when the lower speed ranges are selected, which, if exceeded, will deenergize the motor and cause the stopping of the machine. The motor is thus controlled so as to limit the torque of the motor when lower speed ranges are selected and to provide higher torque when higher speeds are selected in the transmission.

By utilizing such a control arrangement for the prime mover, relatively light weight transmission members may be utilized so as to provide satisfactory control of the transmission in stopping, starting, and making speed changes when it is operating in the high speeds while the torque limiting control for the motor protects the transmission from overloading and damage when operating in the lower speeds.

In this particular exemplary disclosure the prime mover or motor 14 comprises a three-phase A. C. motor which receives its electric power from the supply lines L1, L2, and L3, Figure 3. This electric power supply is transmitted through the main disconnect switch 187 which is serially connected to the motor through leads T1, T2, and T3. In two of the leads, T1 and T2, are provided thermal overload relays OLA which are provided to limit the sustained maximum rated horsepower output of the motor within safe limits as is customary in such practice. Also in the two leads T1 and T2, connected in series with the overload relays OLA are the two current relays SR1 and SR2.

With the main disconnect switch 187 closed to connect power supply leads L1, L2, and L3 to the leads T1, T2, and T3, the motor 14 is started by pressing the start button 188 which completes a circuit from the line 189 connected to the secondary 190 of the control transformer through the normally closed stop button 191, lead 198, start button 188, line 192, control relay CR1 through the normally closed control contacts 193 of the overload relays OLA to the line 194 connected to the other side of the primary 190 of the transformer. The transformer is at all times energized by having its primary winding 195 connected through the leads 196 and 197 to the power supply lines L1 and L3. Thus, pressing the start button 188 energized the control relay CR1 which closes control contact CR1a to connect power from the lead 196 through the contact CR1a and the relay LEA to the line 197 energizing this relay to close the power contacts LEA1, LEA2, and LEA3, and control contact LEA4, to apply line current to the motor 14 and render the control circuits operative. In this way, the motor 14 is brought to a running condition.

When it is desired to manually stop the motor 14, the stop button 191 is depressed which breaks the circuit between the leads 189 and 198 to thereby deenergize control relay CR1 to open contacts CR1a to thereby deenergize relay LEA, causing the power contacts LEA1, LEA2, and LEA3, and control contact LEA4 to open and disconnect power from the motor 14 and deenergize the control circuits. In other words, whenever the relay CR1 is energized, power will be connected to the motor 14 and when this relay is deenergized power will be disconnected from the motor 14.

With the motor running at its normal speed should a sustained load be applied to it in excess of its normal maximum rated horsepower output, the thermal overload relays OLA will become operative to automatically open the control contacts 193, deenergizing the control relay CR1 and thereby disconnecting power from the motor 14.

Means are also provided to effect a stopping of the motor 14 at a lower horsepower output than its maximum rated capacity when the change speed transmission is being operated in its lower range of speeds. Shunted around the starting button 188 is a circuit comprising the leads 198, normally closed contact SR1a, lead 199, normally closed contact SR2a, lead 200, normally open control contact LEA4 connected to lead 192. The control contact LEA4 is provided so that upon deenergizing the relay LEA to open the power contacts LEA1, LEA2, and LEA3, the control circuit supplying the control relay CR1 will also be maintained deenergized after the stop button is again released so as to maintain the motor 14 stopped.

Shunted across the contacts SR1 and SR2 between the leads 198 and lead 200 is a normally open limit switch LS1, Figures 1 and 3, having an operating arm 201 which is actuated by a cam 202 fixed on the drive shaft 133 of the speed selector valve 111, this cam rotating in timed relationship with the rotation of the selector valve to various speed selected positions. The cam 202 is provided with a depressed portion 203 which allows the roller 204 of the operating arm 201 of the limit switch LS1 to move so as to maintain this limit switch open when the selector valve is in any of the lowest speed selecting positions. The cam has a higher portion 205 which engages the roller 204 to move the arm 201 so as to maintain the limit switch LS1 closed while the selector valve 111 is in any of the higher range positions of speed selection.

When the limit switch LS1 is open as shown in Figure 3 with the selector valve 111 in the low speed ranges, as a load is applied to the motor 14 during the cutting operation the current relays SR1 and SR2 in the leads T1 and T2 become operative, when the motor is delivering power to overcome a sustained load below the maximum rated horsepower of the motor, so that upon increase in current in the lines T1 and T2 to a certain predetermined value below the normal rated horsepower delivery of the motor, the relays SR1 and SR2 will be energized so as to open the contacts SR1a and SR2a to thereby break the circuit of the control relay CR1 to cause the power supply to be disconnected from the motor 14 as described. When the selector valve 111 is rotated to the higher speed selection ranges, the limit switch LS1 will be closed by the raised cam surface 205 of the cam 202 so as to shunt out the control contacts SR1a and SR2a so that even though relays SR1 and SR2 are energized and their contacts SR1a and SR2a are opened by the motor exceeding their predetermined reduced horsepower setting the maximum rate of output of the motor may be obtained since the circuit and control relay CR1 will still remain energized. Power will thus continue to be applied to the motor 14 and permit it to rise in horsepower delivery to its maximum output, this maximum output being only limited by the overload relays OLA as described.

Thus, rotation of the selector valve to the low speed ranges automatically operates an electrical control means for changing the power output of the motor 14 to a desired value below the maximum output of the motor to prevent excessive horsepower being transmitted through the change speed transmission at low speeds. As the selector valve is rotated out of a predetermined group of low speeds, the limit switch LS1 will be closed to thereby permit the motor to transmit its full rated horsepower through the higher speeds of the transmission.

What is claimed is:

1. In a transmission and control mechanism for a machine tool, a prime mover, means for connecting or disconnecting said prime mover relative to said transmission, slow speed drive means for driving said transmission when said prime mover is disconnected therefrom at a slower rate than the rate imparted by the connected prime mover, means for connecting or disconnecting said slow speed drive means relative to said transmission, a controller operative to actuate said last-mentioned means, and a timing device for delaying the disconnecting of said slow speed drive means when said control means is rendered inoperative.

2. In a transmission and control mechanism for a machine tool, a prime mover for driving said transmission at the rate of rotation of the prime mover, and means for connecting or disconnecting said prime mover with respect to said transmission, means for effecting speed changes in said transmission, driving means for rotating said transmission, at a rate slower than that of the prime mover, a controller operable to cause said driving means to rotate said transmission when speed changes are being made therein, and a timing device operable to cause continuation of said slow rotation of said transmission for a predetermined interval of time after speed changes have been made in said transmission.

3. In a transmission and control mechanism for a machine tool, a prime mover, a clutch means for connecting or disconnecting the input shaft said prime mover to said transmission, power operable speed changing mechanism for said transmission, means for rotating the input shaft of said transmission at a predetermined speed slower than that of the prime mover when speed changes are being made in said transmission, and means automatically actuatable by the operation of said speed changing means to vary the power transmitted by said prime mover through said clutch to said transmission when certain speed selections have been made in said transmission.

4. In a transmission and control mechanism for a machine tool, the combination of a prime mover, a connect and disconnect clutch to control the application of driving power from said prime mover to the input shaft of said transmission, power operable speed changing means for said transmission, control means operable for disconnecting said clutch for the prime mover and effecting a slower speed rotation of said input shaft of said transmission than that effected by the clutch connection of the prime mover to said shaft while speed changes are being made in said transmission, and means actuatable by the operation of said speed changing means to vary the power transmitted by said prime mover to said transmission when adjusted to certain predetermined speed selections.

5. In a transmission and control for a machine tool, the combination of a prime mover, a transmission including gears rotatable by the prime mover, a connect and disconnect clutch to control the application of driving power from said prime mover to said transmission gears, power operable speed changing means for said transmission, driving means operable at a slower speed than the said prime mover, control means for disconnecting said clutch for the prime mover and connecting said slower speed driving means for rotation of gears of said transmission while speed changes are being made in said transmission, further control means for momentarily continuing said slow speed driving of said transmission and maintaining said clutch disengaged after operation of said power speed changing means, and means operated by said power speed changing means to change the power transmitted by said prime mover to said transmission when certain speeds have been selected.

6. In a transmission and control mechanism, a power operable speed changing device, a prime mover, connect and disconnect means between said prime mover and transmission, fluid pressure actuated means for operating said connect and disconnect means, fluid pressure actuated means for effecting speed changes in said transmission, a source of driving power operable from the prime mover at a slower output rate than that of said prime mover, and fluid pressure control means operated by the speed changing device to effect the connection of said slower speed driving power to said transmission when speed changes are being made therein, and further fluid pressure control means rendered operative by said first-mentioned fluid pressure control means for continuing the application of said slower speed driving power to said transmission for a predetemined interval of time after speed selections have been effected in said transmission, said further fluid pressure control means including means to operate said connect and disconnect means for the prime mover so as to maintain said prime mover disconnected from said transmission until said predetermined interval has expired.

7. In a change speed transmission and control mechanism for a machine tool having a series of shiftable gear elements, hydraulic means for shifting said elements including a variably positionable hydraulic selector valve actuatable for sequentially effecting said shifting movements, a prime mover for driving said transmission, and electric control means for said prime mover and means actuatable by the positioning of said valve to effect sequential changes in the potential horsepower output of said prime mover as said sequential speed selections are effected in said transmission.

8. In a transmission and control mechanism, a change speed transmission including a series of shiftable gear elements, hydraulic gear shifting means for sequentially moving said elements, a prime mover, means for connecting or disconnecting said prime mover to said transmission, a slow speed driving transmission connectable or disconnectable relative to said transmission, fluid pressure control means for said hydraulic gear shifting means driven from said slow speed driving transmission, means for operating said hydraulic gear shifting means, fluid pressure actuatable means for connecting said slow speed driving transmission to slowly rotate gear elements of said change speed transmission during the shifting of said gear elements, fluid pressure control means associated with said last-mentioned fluid pressure actuable means for maintaining said slow speed drive connected for a predetermined period after shifting of said gear elements, and electrical control means operable by said hydraulic gear shifting means to limit the horsepower output of said prime mover when certain speed selections have been effected.

9. In a transmission and control mechanism for a machine tool having a change speed transmission including a series of shiftable gear elements, a hydraulic speed changing mechanism for sequentially shifting said elements including an operating control lever, a prime mover for driving said transmission, connect and disconnect means between said transmission and said prime mover, hydraulic control means for operating said connect and disconnect means including an operating control lever, interlocking mechanism between both of said control levers to restrict their operation to independent movement, driving means connected to rotate gear elements of said change speed transmission at a predetermined slower speed than that effected by connection of the prime mover thereto when said prime mover is disconnected, means rendered effective by the manipulation of the control lever for said speed changing mechanism to effect speed changes in said speed change transmission, hydraulic control means for maintaining said slower speed drive for said transmission effective after said speed changing mechanism has been rendered inoperative, electrical control means for said prime mover operable by said hydraulic speed changing mechanism to limit the horsepower output of said prime mover to said transmission when certain speed selections have been effected in said transmission, and means to disconnect said prime mover from said transmission until said slower speed driving action has been completed.

10. In a transmission and control mechanism for driving a machine tool spindle, a change speed transmission including a series of shiftable elements, hydraulic power operated means for shifting said elements, to select different output rates for the transmission control means for said hydraulic operated means, a prime mover for driving said transmission, an electrical control means for said prime mover to select the horsepower output of said prime mover to said transmission and operative connections between the means to select transmission rates and said electrical control means to operate the latter to select a horsepower output as predetermined output rates are selected for said transmission.

11. In a transmission and control mechanism for a milling machine, the combination of a change speed transmission having a series of shiftable gear elements, a hydraulic shifting mechanism for sequentially shifting said gear elements, a prime mover for driving said transmission interconnected therewith through a main disconnect clutch, control means for rendering said hydraulic shifting mechanism operative, control means for operating said disconnect clutch, interlocking mechanism between both of said control means so that each of said control means is limited to independent operation, electrical control means for said prime mover operable by the actuation of the operating control means for said hydraulic shifting mechanism to automatically limit the power output of said prime mover to said transmission when certain elements of said transmission are shifted into operative engagement, a slower speed drive for actuation of the transmission at a rate slower than that directly effectable by clutch connection of the prime mover to the transmission, means for connecting said slower speed drive through an overrunning clutch to said transmission, hydraulic control means rendered operative by the operation of the control means for the hydraulic shifting mechanism to connect said slower speed driving power to rotate gear elements of said transmission through said overrunning clutch when said hydraulic shifting mechanism is rendered operative to actuate said shiftable elements in said transmission, and further control means operative to maintain said slower speed drive connected to said transmission for a predetermined period of time after said elements have shifted to desired speed selecting positions.

12. In a transmission and control mechanism for a milling machine, having a cutter spindle, a change speed transmission including rotatable gear elements connected to said spindle, hydraulic gear shifting mechanism adapted to effect speed changes in said transmission, a selector valve for controlling the operation of said hydraulic gear shifting mechanism, a prime mover for rotating gears of said transmission to actuate said cutter spindle, a combined clutch and brake device interconnecting said prime mover and said transmission, a common power takeoff from said prime mover for driving said selector valve said takeoff providing a slower speed device for rotating gears of said transmission at slower speed than that effected by the prime mover when speed selections are being made therein including means to connect said slower speed drive to said transmission for a predetermined interval after said speed selections have been made, and control means effective while speed changes are being made to release said brake for free rotation of gear elements of said transmission and of said spindle by said slower speed driving means.

13. In a transmission and control mechanism for a milling machine, having a cutter spindle, a change speed transmission including rotatable gears connected to said spindle, hydraulic gear shifting mechanism adapted to effect speed changes in said transmission, a selector valve for controlling the operation of said hydraulic gear shifting mechanism, a prime mover for rotating gears of said transmission to actuate said cutter spindle, a combined clutch and brake device interconnecting said prime mover and said transmission, a common power takeoff from said prime mover for driving said selector valve said takeoff providing a slower speed drive for rotating gears of said transmission at slower speed than the speed effected by clutch interconnection of the prime mover and transmission when speed selections are being made therein including means to connect said slower speed drive to said transmission for a predetermined interval after said speed selections have been made, control means effective while speed changes are being made to release said brake to permit free rotation of gears of said transmission and spindle by said slower speed driving means, and means including an overrunning clutch to connect said slower speed drive during the deceleration of said transmission by said brake upon disengagement of said clutch to disconnect said prime mover from said transmission.

14. In a transmission and control mechanism for a machine tool, a spindle, a change speed transmission connected to said spindle, hydraulic gear shifting mechanism adapted to effect speed changes in said transmission, a selector valve actuatable to a series of operative positions for controlling the operation of said hydraulic gear shifting mechanism, an electric motor for driving said transmission and spindle, an electric power supply for said motor, power contacts interconnected between said supply and said motor for controlling the operation of said motor, an electrical control means responsive to the flow of current between said supply and said motor to control said power contacts, and means operated by the actuation of said selector valve to certain of said predetermined positions to render said electrical control means operative to control said power contacts.

15. In a transmission and control mechanism for a machine tool, a prime mover, a main drive clutch for connecting or disconnecting said prime mover relative to said transmission to drive same at a first speed, a source of slower speed driving power, actuatable means for connecting or disconnecting said slower speed driving power relative to said transmission, a hydraulic cylinder having a piston connected to actuate said means, hydraulic operating means for said clutch, speed changing means for said transmission operated by a speed change control lever, a hydraulic pressure pump for supplying fluid pressure for the hydraulic operating means for said clutch and said cylinder and piston for said slower speed drive connecting and disconnecting means, a pilot control valve, operated by the movement of said speed change control lever, connected to said pump, a hydraulic pressure operated shuttle valve connected to be actuated from said pump by the operation of said pilot valve, and a hydraulic circuit interconnecting said pump and valves with said hydraulic cylinder so that manipulation of said speed change control lever to effect speed changes in said transmission actuates said pilot valve to cause operation of said shuttle valve to connect fluid pressure from said pump to actuate said piston in said cylinder to connect said slower speed drive to said transmission.

16. In a transmission and control mechanism for a machine tool, a prime mover, a main drive clutch for connecting or disconnecting said prime mover relative to said transmission to drive same at a first speed, a source of slower speed driving power, actuatable means for connecting or disconnecting said slower speed driving power relative to said transmission, a hydraulic cylinder having a piston connected to actuate said means, hydraulic operating means for said clutch, speed changing means for said transmission operated by a speed change control lever, a hydraulic pressure pump for supplying fluid pressure for the hydraulic operating means for said clutch and said cylinder and piston for said slower speed drive connecting and disconnecting means, a pilot control valve, operated by the movement of said speed change control lever, connected to said pump, a hydraulic pressure operated shuttle valve connected to be actuated from said pump by the operation of said pilot valve, a hydraulic circuit interconnecting said pump and valves with said hydraulic cylinder so that manipulation of said speed change control lever to effect speed changes in said transmission actuates said pilot valve to cause operation of said shuttle valve to connect fluid pressure from said pump to actuate said piston in said cylinder to connect said slower speed drive to said transmission, and hydraulic control means in said circuit operated by the movement of said piston to connect said slower speed drive to the transmission, to disconnect operating pressure from said pump to the hydraulic operating means for said main drive clutch.

17. In a transmission and control mechanism for a machine tool, a prime mover, a main drive clutch for connecting or disconnecting said prime mover relative to said transmission to drive same at a first speed, a source of slower speed driving power to drive the transmission at a slower speed, than said first speed, actuatable means for connecting or disconnecting said slower speed driving power relative to said transmission, a hydraulic cylinder having a piston connected to actuate said means, hydraulic operating means for said clutch, speed changing means for said transmission operated by a speed change control lever, a hydraulic pressure pump for supplying fluid pressure for the hydraulic operating means for said clutch and said cylinder and piston for said slower speed drive connecting and disconnecting means, a pilot control valve, operated by the movement of said speed change control lever, connected to said pump, a hydraulic pressure operated shuttle valve connected to be actuated from said pump by the operation of said pilot valve, and a hydraulic circuit interconnecting said pump and valves with said hydraulic cylinder so that manipulation of said speed change control lever to a neutral position from a speed changing position actuates said pilot valve to cause operation of said shuttle valve to connect fluid pressure from said pump to actuate said piston in said cylinder to disconnect said slower speed drive from said transmission.

18. In a transmission and control mechanism for a machine tool, a prime mover, a main drive clutch for connecting or disconnecting said prime mover relative to said transmission at a first speed, a source of slower speed driving power, actuatable means for connecting or disconnecting said slower speed driving power relative to said transmission, a hydraulic cylinder having a piston connected to actuate said means, hydraulic operating means for said clutch, speed changing means for said transmission operated by a speed change control lever, a hydraulic pressure pump for supplying fluid pressure for the hydraulic operating means for said clutch and said cylinder and piston for said slower speed drive connecting and disconnecting means, a pilot control valve, operated by the movement of said speed change control lever, connected to said pump, a hydraulic pressure operated shuttle valve connected to be actuated from said pump by the operation of said pilot valve, a hydraulic circuit interconnecting said pump and valves with said hydraulic cylinder so that manipulation of said speed change control lever to a neutral position from a speed changing position actuates said pilot valve to cause operation of said shuttle valve to connect fluid pressure from said pump to actuate said piston in said cylinder to disconnect said slower speed drive from said transmission, and hydraulic control means in said circuit, operated by the movement of said piston to disconnect said slower speed drive to the transmission, to connect operating pressure from said pump to the hydraulic operating means for said main drive clutch.

19. In a transmission and control mechanism for a machine tool, a prime mover, a main drive clutch for connecting or disconnecting said prime mover relative to said transmission to drive same at a first speed, a source of slower speed driving power, actuatable means for connecting or disconnecting said slower speed driving power relative to said transmission, a hydraulic cylinder having a piston connected to actuate said means, hydraulic operating means for said clutch, speed changing means for said transmission operated by a speed change control lever, a hydraulic pressure pump for supplying fluid pressure for the hydraulic operating means for said clutch and said cylinder and piston for said slower speed drive connecting and disconnecting means, a pilot control valve, operated by the movement of said speed change control lever, connected to said pump, a hydraulic pressure operated shuttle valve connected to be actuated from said pump by the operation of said pilot valve, a hydraulic circuit interconnecting said pump and valves with said hydraulic cylinder so that manipulation of said speed change control lever to a neutral position from a speed changing position actuates said pilot valve to cause operation of said shuttle valve to connect fluid pressure from said pump to actuate said piston in said cylinder to disconnect said slower speed drive from said transmission, and a hydraulic resistance means in said circuit to delay said operation of said shuttle valve for a predetermined interval of time after said speed change control lever is moved to neutral position.

LESTER F. NENNINGER.
EDGAR D. VANCIL.
FRED A. HASSMAN.

REFERENCES CITED

The following references are of record in the file of this patent:

UNITED STATES PATENTS

| Number | Name | Date |
| --- | --- | --- |
| 1,089,053 | Hodgkinson | Mar. 3, 1914 |
| 1,357,384 | Date | Nov. 2, 1920 |
| 1,397,130 | Lansden | Nov. 15, 1921 |
| 1,588,004 | Blood | June 8, 1926 |
| 1,764,405 | Hill et al. | June 17, 1930 |
| 1,904,971 | Ernst et al. | Apr. 18, 1933 |
| 1,965,253 | Nenninger | July 3, 1934 |
| 2,050,245 | Carter | Aug. 11, 1936 |
| 2,050,520 | Carter | Aug. 11, 1936 |
| 2,110,173 | Pohl et al. | Mar. 8, 1938 |